Patented Feb. 13, 1923.

1,445,132

UNITED STATES PATENT OFFICE.

WILLIAM SIDNEY HOWARD DOODY, OF SYDNEY, NEW SOUTH WALES, AUSTRALIA.

PROCESS OF MAKING COMPOSITE SHEETS FROM TEA-TREE BARK.

No Drawing. Application filed October 22, 1920. Serial No. 418,843.

*To all whom it may concern:*

Be it known that WILLIAM SIDNEY HOWARD DOODY, a subject of the King of Great Britain and Ireland, and residing at 80 Hunter Street, Sydney, New South Wales, Australia, has invented certain new and useful Processes of Making Composite Sheets from Tea-Tree Bark, of which the following is a specification.

This invention relates to a process of treating ti or tea tree bark for the purpose of rendering it adaptable for use either as an article of manufacture or for the manufacture of articles therefrom.

The bark treated as hereinafter described is particularly applicable for use as insoles for boots and shoes, as inserts for hats and caps, or for ladies' dress-shields or in the manufacture of such articles. The treated bark is, however, applicable for use for other purposes.

The bark is preferably stripped from the tree into sheets or strips of required thickness, and these sheets or strips are then dried either by exposure to the sun or air or by artificial heat. The strips or sheets are then subjected to pressure sufficient to render them compact, and subsequently, or before they are compressed, they are treated with an oily or a fatty substance which will not give them a disagreeable odor. Paraffine wax with a slight addition of rosin or similar substance has been found suitable for the purpose; a proportion approximately of one per cent of rosin if added to approximately five per cent wax will be sufficient. Treatment of the bark with the oily or fatty substance imparts pliability to it; prevents it from cracking or splitting and consolidates its thin layers. Such treatment of the bark may be effected by either rubbing the oily or fatty substance into it, or by immersing the bark in a bath of the substance. A coating of thin varnish, rubber solution, or collodion or some similar substance, which will render the bark resistant to the passage of moisture therethrough, may be applied to the surface of the bark after it has been treated with the oily or fatty substance.

In the manufacture of insoles for boots or shoes, or inserts for hats or caps, or ladies' dress-shields from the bark treated as before described, it is preferable that the treated strips or sheets of the bark be first cut to the required shape and then surfaced with the varnish, rubber solution, collodion or other moisture resistant substance as before described. These substances may be applied to the surface of the bark either by a brush or by other suitable means. The shaped bark may be covered with thin cloth in which event the varnish or other coating substance may be used as an adhesive for securing the cloth to the bark. If, however, the varnish or other coating substance is applied to the bark and is not to be used as an adhesive for the cloth, the coating substance is first allowed to dry on the bark and the cloth may then be attached to the treated bark either by sewing or other suitable means. In addition to surfacing the bark with the coating substance for the purpose of securing the cloth thereto, the latter may also be sewn to the bark.

The bark referred to herein and in the appended claims is the bark of the paperbark tree or so called tea or ti tree (*Melaleuca leucadendron*, variety *albida*).

What I claim as my invention and desire to secure by Letters Patent is:—

1. A process of manufacture as herein described consisting in drying stripped ti or tea tree bark, subjecting it to pressure to render it compact, and treating it with an oleaginous substance to consolidate its layers.

2. A process of manufacture as herein described consisting in drying stripped ti or tea tree bark, subjecting it to pressure to render it compact, treating it with an oleaginous substance to consolidate its layers, and coating it with a substance to render it resistant to the passage of moisture.

3. A process of manufacture as herein described consisting in drying stripped ti or tea tree bark, subjecting it to pressure to render it compact, treating it with an oleaginous substance to consolidate its layers, coating it with a substance to render it resistant to the passage of moisture, and covering the bark with thin cloth.

4. A process of manufacture as herein described consisting in drying stripped ti or tea tree bark, subjecting it to pressure to render it compact, and treating it with an oleaginous substance to which a small proportion of rosin has been added to consolidate the layers of the bark.

5. A new article of manufacture comprising sheets of T or tea tree bark which have been pressed into a compact mass and treated to consolidate the layers.

6. A new article of manufacture comprising sheets of T or tea tree bark which have been pressed into a compact mass, treated to consolidate the layers, and treated to render it moisture-proof.

In testimony whereof I have affixed my signature.

WILLIAM SIDNEY HOWARD DOODY.